July 6, 1948.  W. E. WILSON  2,444,798

ELECTRODE ADAPTER

Filed Dec. 21, 1946

Inventor:
Wayne E. Wilson,
by Claude A. Mott
His Attorney.

Patented July 6, 1948

2,444,798

UNITED STATES PATENT OFFICE 2,444,798

ELECTRODE ADAPTER

Wayne E. Wilson, Schenectady, N. Y., assignor to General Electric Company, a corporation of New York Application December 21, 1946, Serial No. 717,725

5 Claims. (Cl. 219—8)

My invention relates to an adapter which when used with an arc welding electrode holder enables it to support and supply current to an electrode of larger size than that for which the holder itself is suited. More particularly, my invention relates to an adapter which renders electrode holders for metal electrodes also suitable for holding carbon electrodes which are of larger size than the metal electrodes which the holder will accommodate.

In arc welding, the parts to be united are joined by fusing them together by means of an electric arc with or without using molten metal in addition to that obtained by fusion of the parts to be joined. If the fusing operation is performed with an arc established between a carbon electrode and the work, the operation is known as carbon arc welding. If the welding operation is performed with an arc established between a metal electrode and the work, the operation is known as metal arc welding. In metal arc welding, the electrode itself is also fused by the arc and the fused metal of the electrode is added to the weld. In carbon arc welding, if metal is to be added to the weld, this additional metal is obtained by feeding a filler rod into the arc so that its terminal portion is fused and added to the weld.

There are certain welding operations that can best be performed by metal arc welding just as there are other welding operations that can be best performed by using the carbon arc. An electrode holder for metal electrodes is not usually suited for holding a carbon electrode because its physical structure is designed primarily for holding electrodes of a smaller diameter than used in carbon arc welding. Adapters have consequently been proposed for holding carbon electrodes and supplying welding current thereto through the agency of holders that are not otherwise suitable for this purpose.

It is an object of my invention to provide an improved adapter for carbon electrodes used in arc welding operations with electrode holders having a jaw spread less than that required for holding said carbon electrodes.

Further objects of my invention will become apparent from a consideration of the following description of two embodiments thereof shown in the accompanying drawing. The embodiment shown in Fig. 1 has been illustrated in position between the jaws of a holder designed primarily for use with metal electrodes, and Fig. 2 is a cross sectional view illustrating certain features of construction of the adapter shown in Fig. 1.

Figure 1:
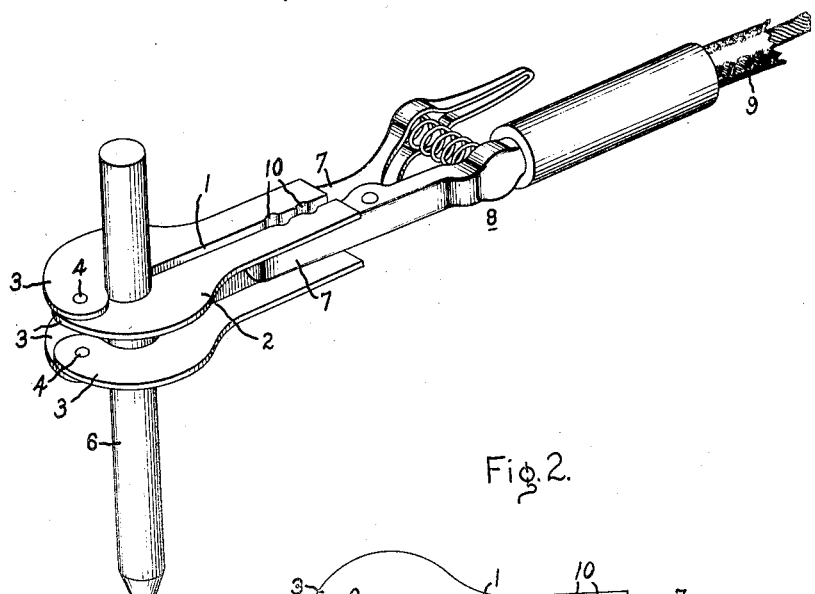
Figure 2:
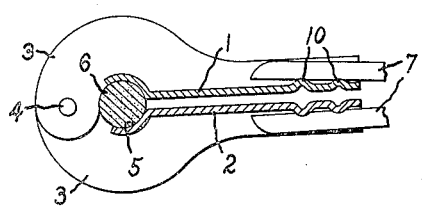
Figure 3:
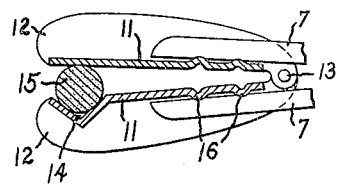

Fig. 3 is a cross sectional view of another embodiment of my invention which is suitable for holding carbon electrodes of various sizes, whereas the embodiment illustrated in Figs. 1 and 2 is limited in its use to holding electrodes of substantially a single size.

The adapter illustrated in Figs. 1 and 2 comprises cooperating metal members 1 and 2 which overlay one another in electrode holding position and each of which has along its edges outwardly turned flanges 3 which are hinged together by a pin or pins 4 at corresponding ends of the members to form a hinge clamp. Each of the members 1 and 2 is provided with an electrode holding recess 5 extending transversely thereof and located between the hinged connection between the members and their free ends. A carbon electrode 6 is held and engaged by the surfaces of the recessed portions 5 of each member when its free ends are engaged and clamped by the jaws 7 of an electrode holder 8.

The electrode holder illustrated is of the clamp type frequently employed for holding and supplying electric current to metal electrodes. In the illustrated arrangement, welding current is supplied through a welding cable 9 connected to the electrode holder 8 and through this holder and its jaws 7 to the metal members 1 and 2 of the adapter which engage the carbon electrode 6 by lever clamping action resulting from the forces applied by the jaws 7 on the adapter.

It will be noted from a consideration of Figs. 1 and 2 of the drawing that the internal electrode holding surfaces of the adapter engage the electrode 6 along substantial areas, thereby not only distributing the force of the clamping action so as to prevent shattering of the electrode but also insuring a considerable area of contact between the adapter and the electrode and thus preventing overheating of the adapter or the electrode therein. Furthermore, it will be noted that the holding jaws 7 of the electrode holder engage the free ends of the hinged members of the adapter along a substantial area of contact and thereby insure a low resistance connection between the adapter and the electrode holder which will also prevent overheating of the same due to the supply of welding current therethrough. Moreover, the flanged edge portions of each of the members of the adapter operate as heat-radiating fins although an equally important function thereof is the stiffening of the members so that they may be made of light construction. Preferably they are of sheet metal which has been punched and shaped to the configurations illustrated in the drawing. Being made of metal, they are, of course, conductive of the electric current supplied to the electrode. It is, of course, not essential that each of the members be formed entirely of metal or of an electrically conductive material so long as one of the electrode holding surfaces and one of the external seating surfaces for the jaws of the electrode holder are electrically connected with one another to supply welding current from the jaws of the electrode holder to the electrode clamped between these members.

It will also be noted that the free ends of the members 1 and 2 are provided with cross ribs 10 which, in the arrangement illustrated, are spaced from one another to correspond with the spacing of the cross grooves in the jaws 7 of the electrode holder 8. The interengagement of these cross ribs of the adapter and cross grooves of the jaws of the electrode holder prevent displacement of the adapter endwise of the jaws of the electrode holder. Furthermore, the flanged edge portions 3 of the members of the adapter, by engaging the sides of the jaws of the electrode holder, prevent turning of the adapter in the holder, as might otherwise occur during manipulations of the assembly such as occur in welding.

The adapter illustrated in Figs. 1 and 2, as previously pointed out, is primarily for carbon electrodes used in arc welding operations with electrode holders having a jaw spread less than that required for holding the carbon electrodes. Thus it is believed to be obvious from a consideration of the drawing that it would be difficult properly to support the carbon electrode 6 between the jaws 7 of the electrode holder, whereas with the adapter this has been readily accomplished. Furthermore, it will be noticed that the construction of the adapter is such that the seating surfaces at the free ends of the hinged members of the adapter are spaced from one another less than the jaw spread of the electrode holder 8 when the carbon electrode 6 is engaged by the electrode holding surfaces of the adapter.

The adapter illustrated in Figs. 1 and 2 is intended primarily for holding electrodes of substantially a single size. My invention may also be embodied in an adapter which is suitable for holding electrodes of varying sizes. Such an adapter is illustrated in Fig. 3 of the drawing. This adapter also comprises cooperating metal members 11 which overlay one another in electrode holding position and each of which has along its edges outwardly turned flanges 12 which are hinged together by a pin or pins 13 at corresponding ends thereof. One of the members 11 is provided with a transversely extending V-shaped groove 14 within which the electrode 15 is seated and held by an opposed flat surface of the cooperating member 11. It will also be noted that the embodiment shown in Fig. 3 is also provided with cross ribs 16 for engaging the cross grooves in the jaws 7 of the electrode holder 8. These cross ribs and the side flanges of the members of the adapter insure that it will stay in position between the jaws of the electrode holder. Furthermore, the electrode holding arrangement provided makes the adapter of Fig. 3 suitable for use with electrodes of varying sizes. It will also be noted that the adapter of Fig. 3 uses a different lever action from that employed in the adapter of Figs. 1 and 2. In Figs. 1 and 2, the electrode is held in a recess located between the pivot pin or pins and the seating surfaces for the jaws of the electrode holder, whereas in Fig. 3 the seating surfaces for the jaws of the electrode holder are located between the electrode holding recess and the pivot pin connection of the members.

The adapter illustrated in the drawing may be used with electrode holders of constructions other than that illustrated. The clamp type holder illustrated is provided with jaw members having respectively a nesting V ridge and groove lengthwise thereof to provide a three-point engagement with electrodes held thereby. Holders having flat surfaced jaw members, which may or may not be grooved transversely or diagonally for electrode support, may also be used. My adapter may also be used with other types of electrode holders, such as the spring-rod type shown in Fig. 5 of U. S. Letters Patent 1,635,764, Earl B. Paxton, July 12, 1927. Obviously other types of electrode holders may be used since the adapter illustrated is well suited for cooperation with various forms of electrode holders. Obviously the adapters illustrated may be variously modified without departing from the spirit and scope of my invention, in order to make them suitable for use with other types of electrode holders whenever such modification becomes necessary because of the particular type of electrode holder with which they are to be used.

It is quite apparent that other modifications may be made of my invention without departing from the spirit and scope thereof. Thus the embodiments illustrated in the drawing may be variously modified. For example, the cooperating members of the adapter may be formed of castings instead of being formed, as previously stated, of punched and shaped sheet metal, although this construction will in most cases be desirable because of the cheaper cost of fabrication and the greater durability and less weight of the resulting adapter. Furthermore, for use with electrically insulated electrode holders, the adapter may also be insulated. Thus, instead of making the flanges integral with the body portion of each of the cooperating members, these flanges may be made of insulating material suitably attached to the body portion of the cooperating clamping members of the adapter. Also, the arrangements illustrated in the drawing may be employed and suitable insulation obtained by attaching insulating material to the flanges.

Various metals may be used for the adapter. Most generally aluminum, copper or some similar metal will be used because of its better heat-radiating, current-conducting, and weld-spatter-resisting qualities.

These and other variations of my invention will occur to those skilled in the art and I aim, therefore, to cover in the appended claims all such modifications which fall within the the true spirit and scope of my invention.

What I claim as new and desire to secure by Letters Patent of the United States is:

1. An adapter for carbon electrodes used in arc welding operations with electrode holders having a jaw spread less than that required for holding said carbon electrodes, said adapter comprising cooperating hinged members having, in electrode holding position, overlaying portions provided with internal electrode holding surfaces and external seating surfaces for the jaws of an electrode holder, said external seating surfaces being spaced from one another less than the jaw spread of said electrode holder when said electrode holding surfaces engage an electrode located and held between said members and at least one of said electrode holding surfaces and one of said external seating surfaces of said members being electrically connected with one another to supply welding current from the jaws of said holder to the electrode clamped between said members.

2. An electrode adapter for electrode holders used in arc welding, said adapter comprising hinge-connected members having, in electrode holding position, overlaying portions with inside electrode engaging surfaces forming a recess extending transversely of said members and of a size to hold an electrode that is too large to be inserted between the jaws of an electrode holder with which said adapter is to be used and having outside seating surfaces spaced from one another less than the jaw spread of said electrode holder between which said members are adapted to be inserted, said outside seating surfaces of said members being spaced lengthwise of said members from said electrode engaging inside surfaces thereof by amounts sufficient to position the electrode in said adapter beyond the jaws of said electrode holder in which said adapter is inserted with said jaws engaging said seating surfaces of said members, and at least one of said inside surfaces being electrically connected with one of said outside surfaces for supplying electric current from the jaws of said electrode holder to an electrode in said adapter.

3. An electrode adapter for electrode holders used in arc welding, said adapter comprising cooperating members overlaying one another in electrode holding position and each having along its edges outwardly turned flanges which are hinged together at corresponding ends of said members to form a hinged clamp, said members having an electrode holding recess extending transversely thereof and having a surface electrically connected with a surface portion of said members adapted to be engaged by the jaws of an electrode holder between which said members are adapted to be inserted and held from turning therebetween by said outwardly turned flanges engaging the sides of said jaws of said electrode holder.

4. An electrode adapter for electrode holders used in arc welding, said adapter comprising cooperating members overlaying one another in electrode holding position and each having along its edges outwardly turned flanges which are hinged together at corresponding ends of said members to form a hinged clamp, the flange portions of each of said members being spaced from one another to accommodate the clamping jaws of an electrode holder and prevent turning of said adapter relative thereto when said adapter is inserted between said jaws, and said members having a transverse electrode holding recess spaced from the hinged connection between said members and electrically connected with a surface of said members adapted to be engaged by said clamping jaws of said holder.

5. An electrode adapter for electrode holders used in arc welding, said adapter comprising cooperating metal members overlaying one another in electrode holding position and each having along its edges outwardly turned flanges which are hinged together at corresponding ends of said members to form a hinge clamp, said members having an electrode holding recess extending transversely thereof and located between the hinged connection between said members and their free ends which are adapted to be held between the jaws of an electrode holders and positioned relative thereto by said flanged edges of said members.

WAYNE E. WILSON.

REFERENCES CITED

The following references are of record in the file of this patent:

UNITED STATES PATENTS

| Number | Name | Date |
|---|---|---|
| 2,411,329 | Mankouski | Nov. 19, 1946 |